Figure 3:
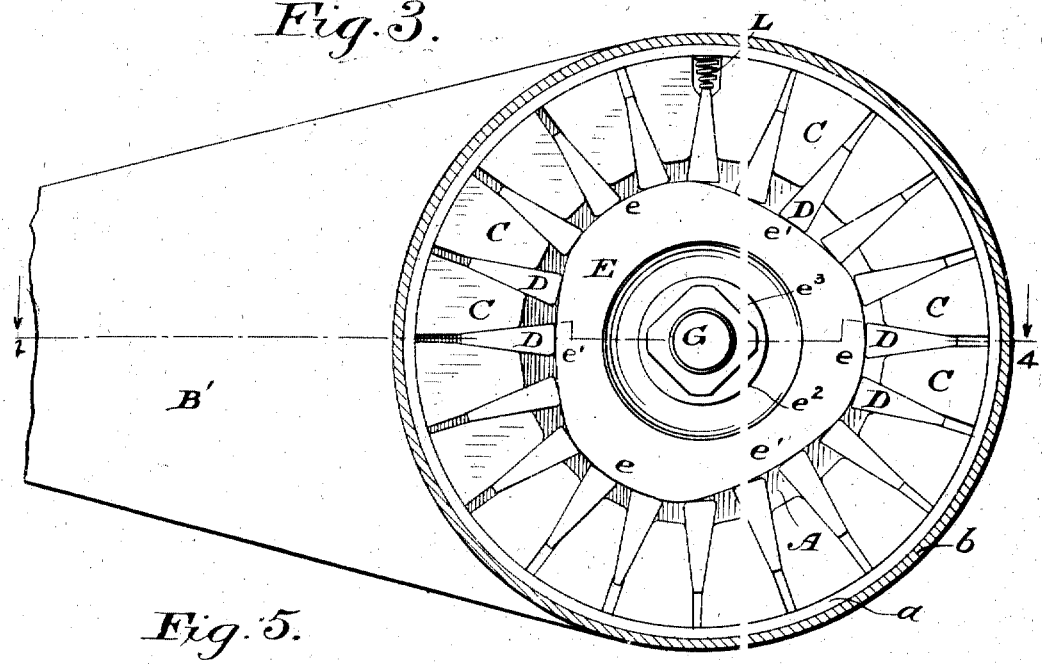

P. M. FREER.
FRICTION DEVICE.
APPLICATION FILED FEB. 5, 1910.
1,008,635.
Patented Nov. 14, 1911.
2 SHEETS—SHEET 1.
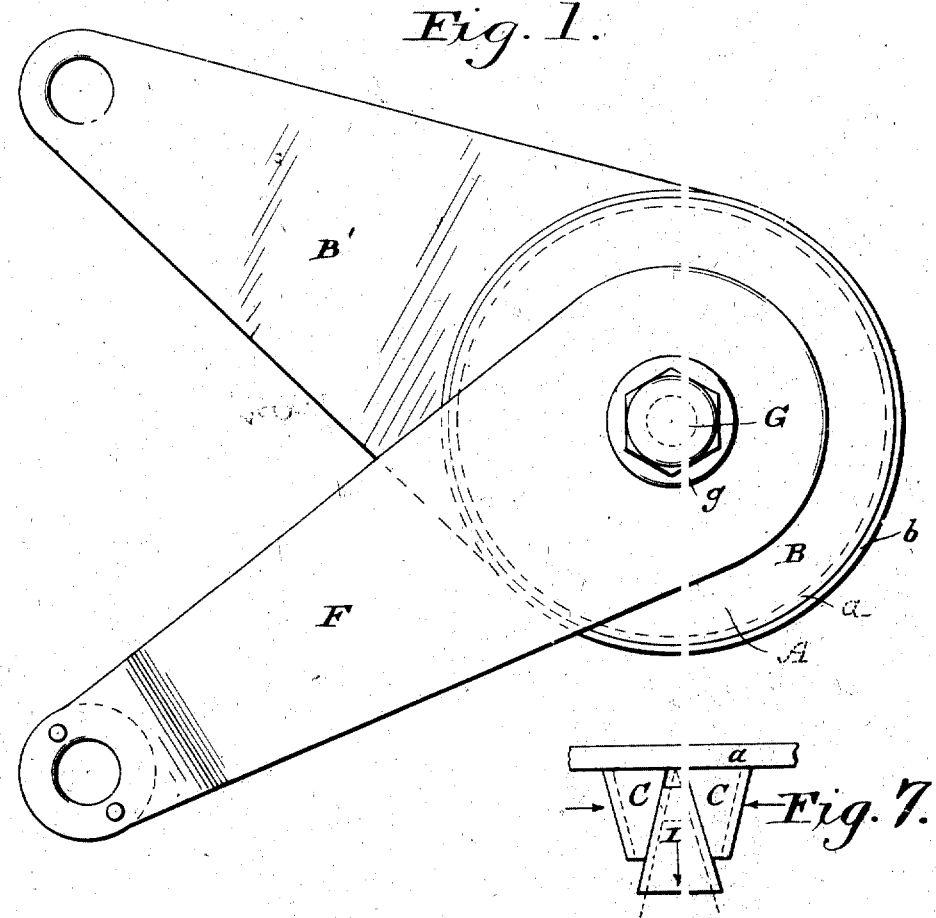
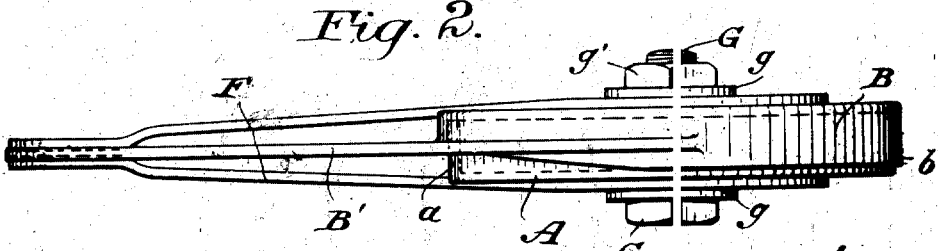
Witnesses
E. B. Gilchrist
H. R. Sullivan
Inventor
Phelbs M. Freer
by Thurston & Kwis
attorneys

P. M. FREER.
FRICTION DEVICE.
APPLICATION FILED FEB. 5, 1910.

1,008,635.

Patented Nov. 14, 1911.

2 SHEETS—SHEET 2.

Witnesses
E. B. Gilchrist
H. R. Sullivan

Inventor
Phelps M. Freer
by Thurston & Kwis
Attorneys

UNITED STATES PATENT OFFICE.

PHELPS M. FREER, OF BARBERTON, OHIO.

FRICTION DEVICE.

1,008,635.  Specification of Letters Patent.  Patented Nov. 14, 1911.

Application filed February 5, 1910. Serial No. 542,219.

*To all whom it may concern:*

Be it known that I, PHELPS M. FREER, a citizen of the United States, residing at Barberton, in the county of Summit and State of Ohio, have invented a certain new and useful Improvement in Friction Devices, of which the following is a full, clear, and exact description.

This invention relates to a friction device designed to retard the movements of parts relatively to each other and adaptable for use in many different kinds of appliances, and perhaps in different forms from those shown in the drawings. These drawings illustrate principally a form designed for special use as a shock absorber for the springs of automobiles, or like vehicles, but it is not intended to limit it to this use, or its forms to those shown in the drawing.

In the main, the invention consists of two opposed series of intermeshing wedges or blocks having inclined edges and set within a given space, the bases of one set abutting against a wall and the protruding bases of the other inverse set acted upon by a cam member movable in a path substantially parallel to said wall and having a curved or waved surface, the crests and valleys of which are about equally disposed along a median line so that the displacements caused by the wedges being driven into deeper engagement by the crests of the cam may be compensated for by the retreat of other wedges into the space afforded by the valleys of the cam surface.

Figure 5:
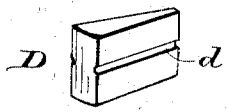
Figure 4:
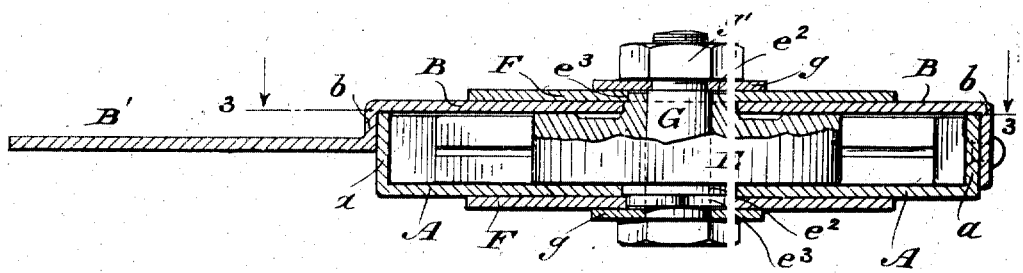
Figure 6:
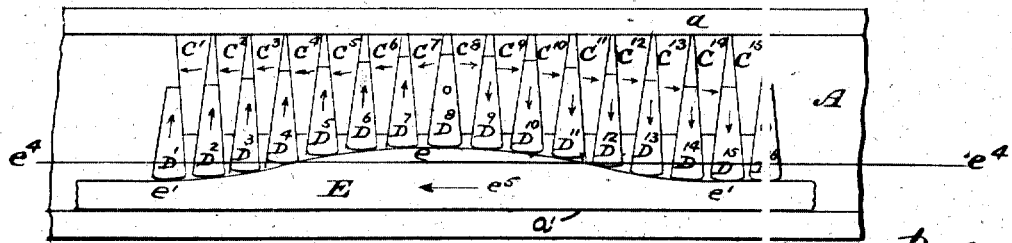

In the drawings, Figure 1 is a side elevation of a casing containing the wedges and cam of this invention, the casing having an arm adapted to be attached to one member, say of an automobile spring, while the cam member has another arm adapted to be attached to the other member of the automobile spring. Fig. 2 is a plan view of the same. Fig. 3 is an elevation, partly in section, on the line 3—3 of Fig. 4, showing the arrangement of the two series of wedges, and the cam adapted to operate upon them. Fig. 4 is a longitudinal section of the same on the line 4—4 of Fig. 3. Fig. 5 is a perspective view of one of the wedges of one series, showing it grooved along its operative side to facilitate lubrication. Fig. 6 is a diagrammatic view of two sets of wedges and a waved face cam adapted to operate thereon, the figure being intended only to illustrate and aid in the explanation of the principles of the invention; and Fig. 7 is a corresponding view of a group of three wedges for the purpose of further illustration.

To first explain the construction of the drawings A represents a stamped metal casing having an annular flange $a$, and closed by a stamped metal cap B having an annular flange $b$ closely fitting on the outside of the flange $a$ of the casing and firmly secured thereto by screws, rivets or otherwise as desired, the two parts of the casing acting as a single member, in operation. From the cover B there extends a lever arm B' preferably made integral with the cover. Within the casing is located an annular series of wedge members C, the broad outer bases of which bear against the annular flange $a$ of the casing and adapted, if necessary, to move sidewise or circumferentially on its inner face. In the spaces between these wedges is another set of wedges D which extend for a greater portion of their lengths into the spaces between the wedges C and bear at their inner base ends against a cam E provided, in this case with a series of three crests or high spots $e$, and three corresponding valleys $e'$ between these crests. This cam has trunnions $e^2$ on each side which are fitted into suitable bearing apertures in the casing and cover, and the ends of the trunnions are squared as at $e^3$ to receive lever arms F fitted snugly thereon and held in place by a bolt G having washers $g$ under its head at one side, and under its nut $g'$ on the other. These arms are preferably drawn together and united at a point near their extremities to act as a single member in operating the cam. In practice each of these arms F and B' would be attached to one of two members movable relatively to each other, the action of the device being intended to retard these movements of the members rather than to limit them, so that if one arm were attached to the top of an elliptic spring, and the other to the lower member of the spring, they would simply prevent too rapid action of the spring, while permitting if necessary, its full range of movement and acting on an automobile spring as a shock absorber.

In the operation of the device, the projecting wedges D bear against the cam as shown and retard its rotative movement relatively to the casing. The wedges C bear at their outer base ends against the wall of the casing, and as a general proposition are stationary relatively to it, except as they may be moved when laterally displaced by the wedges D to provide space for such wedges. As some of the wedges D are being driven outwardly by the crests e of the cam and more deeply into the spaces between the wedges C these spaces must enlarge and those wedges C adjacent thereto must move laterally and away from each other, to provide the required additional space for the out-thrust wedges D. Now, as the wedges C are giving up additional space to the wedges D at this point, they must at some other point in the series find space that will compensate for that given up to the out-moving wedges D. This space is provided for further along in the series by the inward movement or retreat of other wedges D into the valleys e' of the cam, this retreat of the wedges D permitting adjacent wedges C drawing together to the same aggregate extent as those previously mentioned are forced apart. This inward movement of the wedges D is produced by the side thrusts upon them of adjacent wedges C with sufficient pressure to slip them out of their spaces between said wedges C. This is illustrated in Fig. 7, where, if the wedges C are subjected to heavy thrusting pressure from opposite directions, as shown by horizontal arrows, they are forced together and squeeze the wedge D out, as shown by arrow on wedge D and by the dotted lines. The amount of side pressure on the wedges C to effect in this manner the displacement of the wedges D is doubtless directly proportional to the angles of inclination of the wedged surfaces, the more acute the angle the greater the resistance and the greater the pressure required to overcome this resistance, with inverse requirements, as these angles become more obtuse.
Fig. 6 is a diagrammatic view of portions of the two series of wedges and an actuating cam developed on a flat plane instead of circular form as in the other views of the drawings, the cam showing one crest e, and two valleys e' about equally pitched above and below a median line e⁴. Assuming in this case that the cam E is moving in the direction of the arrow e⁵ against a rigid guide wall a' parallel with the wall a behind the wedges C, all of the wedges D' to D⁷ will be thrust outwardly by said cam and more deeply into the spaces between the wedges C' to C⁷, causing all of said wedges C to move sidewise, as indicated by the arrows thereon, and, of course, carrying with them, in this movement, the interspaced wedges D. In this movement of the cam E before referred to, the wedge D⁸, which has arrived at the summit e of the cam is pressing in both directions against the wedge C⁷ in one direction and the wedge C⁸ and others beyond it up, say, to C'⁵ in the opposite direction this wedge C'⁵ lying against wedge D'⁶, which is at the very bottom of the valley e'. Now, as all of the wedges,—say from D⁹ to D'⁵ are being forced or squeezed out from between their adjacent wedges C, they permit lateral movement of the wedges C which draw together, contracting the spaces between them and thereby compensating for the enlargement of the spaces demanded by the out-thrust D wedges on the other side of the crest e. In this illustration, the wedge D⁸ stands on the crest e, and has no further outward movement, and is effecting no more lateral displacement of the wedges at each side of it. The wedge D'⁶ is at the bottom of the valley e', the inmost point of its retraction, so that it can make no more space to compensate for the displacements of the outgoing wedges. Now, all of the other wedges, except those mentioned and those immediately adjacent thereto, are in a state of more or less active movement, the C wedges merely moving laterally along the casing, while the D wedges move in and out, and also laterally as influenced by the C wedges.

It will be understood that the retarding effect upon the cam E by the D wedges is due in some measure to the frictional contact of the cam with the ends of those D wedges which the cam is forcing outwardly, but it is more largely due to the frictional resistance set up in the body of the opposed series of wedges, where the outward thrusts of one D wedge causes a lateral pressure which is transmitted laterally through a number of other wedges, which said lateral pressure forces a D wedge, remote from the first, inwardly with a movement opposite to that of the first mentioned wedge, and at a right angle to the line of said lateral pressure.

It is intended that the casing shall be made absolutely oil-tight, and kept filled with lubricant so that the wedges will always be running in oil and never liable to stick. To facilitate the admission of oil between the blocks, longitudinal grooves may be formed in their working faces as shown at d in Fig. 5, and also in the faces of the blocks C, if desired, such being common practice.

Of course, as before stated, if the working angles of the wedges are made more obtuse than shown in the drawings, less power will be required to squeeze the D wedges out from between the C wedges. In some cases, perhaps with the acute angles shown, light springs L might be employed to operate against the outer ends of the D wedges, as shown in Fig. 3, the outer ends of the C wedges being cut away at each side to form suitable recesses for such springs, as shown.

The shape of the cam surface may be changed as desired to suit varying requirements, it being essential only that the aggregate endwise movement outwardly of any number of the D wedges shall be equaled by a corresponding aggregate of inward endwise movement of the other remote blocks moved thereby.

The invention lies chiefly in the arrangement of the wedges and coöperating cam, the wedges practically partaking of the condition of the casing inclosing them in the matter of movement while the cam moves or rotates freely relatively to the casing and its wedges. In the drawings two lever arms are shown, one for the casing and one for the cam, but this is not essential in all cases for either member, the casing or the cam, might be made without an arm and fastened directly upon one of the elements it is designed to work with while the other member would be provided with an arm, as shown, to be attached to the other element.

Having described my invention, I claim:

1. In a friction device, the combination of a wall, a series of wedge members having their bases resting against said wall, a series of inverse wedge members partially intermeshed with the first series, their bases projecting beyond the apices of said first mentioned series, with a cam member adapted to act upon the said projecting base ends of the second mentioned series of wedge members to move them endwise relatively to said first mentioned series.

2. In a friction device, the combination of a wall, a series of wedge members having their bases resting against said wall and movable laterally thereon, a series of inverse wedge members movable endwise and partially intermeshed with said first mentioned series, their base ends projecting beyond the apices of the first mentioned series, a cam having a waved surface adapted to act upon the projecting bases of the second mentioned series of wedges, said cam moving in a path substantially parallel to the said wall.

3. In a friction device, the combination of a wall, a series of wedge members movable sidewise and having their bases resting against said wall, a series of inverse wedge members movable endwise, partially intermeshed with the first mentioned series and having their base ends projecting beyond the apices of said first mentioned series, all of said wedge members of both series being arranged within a given length of space, with a cam member movable parallel with said wall, having alternate swells and depressions adapted to act upon the said projecting ends of the second mentioned series of wedge members to move them endwise whereby the first mentioned members are caused to move sidewise.

4. In a friction device, the combination of a wall, a series of wedge members having their bases resting against said wall and movable laterally thereon, a series of inverse wedges movable endwise and partially intermeshed with said first mentioned series, their base ends projecting beyond the apices of the first mentioned series all of said wedges being arranged within a given length of space, with a cam having a waved face adapted to operate on said projecting ends of the wedges, the crests or high parts of the cam driving some of the projecting wedge members into deeper mesh with the opposing wedges while its depressions or low parts permit of the compensating retreat of other wedges of the same series.

5. In a friction device, the combination of a disk provided with an annular wall, an annular series of wedges having their bases resting on said wall and movable circumferentially therealong, a series of inverse wedges partially intermeshed with said first set and movable endwise radially, a rotatable cam having a waved face adapted to engage and move said inverse wedges serially into deeper mesh with the wedges of the other series and to provide space for the aggregate serial retreat of certain other wedges, the two series of wedges when in mean engagement just fairly filling the annular space provided for them inside the annular wall.

6. In a friction device constructed and adapted to operate substantially as hereinbefore described to retard the relative movements of two bodies, the combination of a casing and a cam with two opposed sets of intermeshing friction wedges lying between them, and rigid external means on said casing and said cam adapted to be secured respectively to two opposed relatively movable bodies, to control their movements as described.

7. In a friction device constructed and adapted to operate substantially as hereinbefore described to retard the relative movements of two bodies, the combination of a casing and a cam with two opposed sets of intermeshing friction wedges lying between them, and means for suitably securing the casing and the cam respectively to the two said relatively movable bodies.

In testimony whereof, I hereunto affix my signature in the presence of two witnesses.

PHELIS M. FREER.

Witnesses:
H. R. SULLIVAN,
WM. A. SKINKLE.